United States Patent
Whitmyer, Jr.

(10) Patent No.: US 8,914,855 B2
(45) Date of Patent: Dec. 16, 2014

(54) PORTABLE PASSWORD KEEPER WITH INTERNET STORAGE AND RESTORE

(75) Inventor: Wesley W. Whitmyer, Jr., Stamford, CT (US)

(73) Assignee: WhitServe LLC, Stamford, CT (US)

( * ) Notice: Subject to any disclaimer, the term of this patent is extended or adjusted under 35 U.S.C. 154(b) by 1038 days.

(21) Appl. No.: 12/752,681

(22) Filed: Apr. 1, 2010

(65) Prior Publication Data

US 2011/0247060 A1   Oct. 6, 2011

(51) Int. Cl.
 G06F 7/04   (2006.01)
 G06F 21/34  (2013.01)
(52) U.S. Cl.
 CPC ..................................... *G06F 21/34* (2013.01)
 USPC ............................................................ 726/5
(58) Field of Classification Search
 USPC ................................. 726/5, 6, 9, 27; 713/185
 See application file for complete search history.

(56) References Cited

U.S. PATENT DOCUMENTS

| | | | | |
|---|---|---|---|---|
| 2002/0147912 A1* | 10/2002 | Shmueli et al. | ............... | 713/182 |
| 2003/0159071 A1* | 8/2003 | Martinez et al. | ............. | 713/202 |
| 2004/0193925 A1 | 9/2004 | Safriel | | |
| 2006/0075230 A1* | 4/2006 | Baird et al. | .................... | 713/168 |
| 2007/0083906 A1* | 4/2007 | Welingkar | .................... | 725/110 |
| 2007/0226783 A1* | 9/2007 | Mimlitsch | ......................... | 726/4 |
| 2010/0037046 A1* | 2/2010 | Ferg et al. | ..................... | 713/155 |
| 2011/0047606 A1* | 2/2011 | Blomquist et al. | ................ | 726/7 |

OTHER PUBLICATIONS

Purdy, The Easy, Any-Browser, Any-OS Password Solution, http://lifehacker.com/5483119/the-easy-any+browser-any+os-password-solution, published Mar. 2, 2010, retrieved [Aug. 7, 2013 3:04:08 PM].*
Damien, Sync Your Passwords Across Different Browsers With LastPass, http://www.maketecheasier.com/sync-your-passwords-across-different-browsers-with-lastpass/2009/01/16, published Jan. 16, 2009, retrieved: [Aug. 5, 2013 4:51:38 PM].*
Handy Password—Password Manager and Form Filler; Copyright © 2004-2007 Novosoft LLC. All rights reserved; www.handypassword.com; Mar. 12, 2008; 5 pages.
Password Manager—CyberScrub KeyChain Password Manager; © 2008 CyberScrub LLC; www.cyberscrub.com; Jul. 28, 2008; 3 pages.
Portable password manager—quick access to your passwords; Copyright © 2004-2007 Novosoft LLC. All rights reserved; www.handypassword.com; Mar. 30, 2008; 1 page.
RoboForm2Go: Portable Automated Password Manager, Form Filler, Password Generator for USB key; ©1999-2008 Siber Systems, Inc.; www.RoboForm2Go.com; Aug. 22, 2008; 1 page.
Save and store passwords on the email server with Handy Password manager; Copyright © 2004-2007 Novosoft LLC. All rights reserved; www.handypassword.com; Mar. 14, 2008; 1 page.

\* cited by examiner

*Primary Examiner* — Brandon Hoffman
(74) *Attorney, Agent, or Firm* — St. Onge Steward Johnston & Reens LLC (57) ABSTRACT

A system for portable storage of information with Internet storage and restore, including a portable memory device, the portable memory device being thumb-sized or smaller and readily attachable to computers, a server, at least one database in communication with the server including password information pertaining to each of a plurality of users, at least one user computer in communication with the server via the Internet, an interface providing each of the plurality of users with access to the server via the Internet, software executing on the server for receiving user-identifying data via the interface pertaining to a particular user, software executing on the server for retrieving password information associated with the particular user from the database, software executing on the server for transferring a copy of the retrieved encrypted password information from the database to the portable memory device via the user computer.

27 Claims, 6 Drawing Sheets

PORTABLE PASSWORD KEEPER WITH INTERNET STORAGE AND RESTORE

FIELD OF THE INVENTION

The invention relates to a system and method for storing personal information, and more specifically to a system and method for storing passwords on a portable memory device with an internet storage and restore feature.

BACKGROUND OF THE INVENTION

The use of passwords to access computers, applications, and online websites and utilities has become commonplace. With the increasing number of password protected services being available via the internet, including email, travel, shopping, banking, and remote computer access, among many others, individuals are tasked with remembering or storing countless log-in ID's and passwords.

A number of password management programs are available to assist with storing passwords. For example, several desktop programs and browser plug-ins are available to store passwords and automatically enter passwords to log-in to websites. While such programs are useful when using one's own personal computer, they do not help when using different computers.

Some applications are available to store passwords on a portable device, such as a USB flash drive, to enable password access on multiple computers. For example, RoboForm2Go allows users to carry all their passwords, contacts, and bookmarks on a USB flash drive. The USB flash drive can be plugged into a PC and the data on the USB flash drive accessed to log into websites or fill in forms. RoboForm2Go can copy password information from the user's computer upon an initial set up of the USB flash drive. KeyChain Password Manager by CyberScrub LLC is a similar password manager program that runs from a user's personal computer or a USB drive. The USB drive synchronizes with the user's personal computer to back up the user's password list. However, RoboForm2Go and KeyChain Password Manager do not include online access to passwords and thus are not useful if you are away from the own computer and lose your USB flash drive.

Handy Password Manager by Novosoft LLC is a portable USB password manager that allows access to personal information on any computer in which the USB flash drive is inserted. Handy Password Manager allows users to keep a database of the personal information on a third party email server. However, this requires that the user specify a particular email server with which they have an account and provide all the associated settings, such as POP3 settings. To use the passwords on a remote computer, the user must download the passwords from the email server and store them on the remote computer. The Handy Password Manager software application must also be downloaded and stored on the remote computer. Thus, Handy Password Manager is not a practical option for quick and secure access to passwords on remote and public computers.

It is therefore desired to provide a password storage system that overcomes the drawbacks in the prior art.

SUMMARY OF THE INVENTION

Accordingly, it is an object of the present invention to provide a password keeping system with Internet storage and restore features. It is a further object of the present invention to provide such a system which is securely useable on a remote computer without storing any applications or data on the remote computer.

These and other objectives are achieved by providing a system for portable storage of information with Internet storage and restore, including a portable memory device, the portable memory device being thumb-sized or smaller and readily attachable to computers, a server, at least one database in communication with the server including password information pertaining to each of a plurality of users, at least one user computer in communication with the server via the Internet, an interface providing each of the plurality of users with access to the server via the Internet, software executing on the server for receiving user-identifying data via the interface pertaining to a particular user, software executing on the server for retrieving password information associated with the particular user from the database, software executing on the server for transferring a copy of the retrieved password information from the database to the portable memory device via the user computer.

In some embodiments, the system includes software executable on the user computer or the portable memory device for decrypting the portable memory device upon receiving and verifying a portable memory device password entered by the user. The system may also include software for displaying the interface via an Internet browser on the user computer, and providing access to the particular user's password information in the database upon verifying the portable memory password or web passkey password entered by the user.

In some embodiments, the system includes software executing on at least one of the server and the user computer for auto-filling password information stored on the portable memory device into an Internet browser displayed on the user computer. The software for auto-filling password information may be stored on the portable memory device.

Further provided is a method of storing, backing up, and restoring information on a portable memory device, including the steps of connecting a portable memory device to a computer, the portable memory device being thumb-sized or smaller, displaying an interface on the computer, receiving a user log-in to a server via the interface, manipulating the user log-in to identify password information associated with a particular user in at least one database in communication with the server including password information pertaining to each of a plurality of users, retrieving the identified password information associated with the user from the at least one database, and transferring a copy of the retrieved password information from the database to the portable memory device via the computer.

Other objects of the invention and its particular features and advantages will become more apparent from consideration of the following drawings and accompanying detailed description.

DETAILED DESCRIPTION OF THE INVENTION

Figure 1:
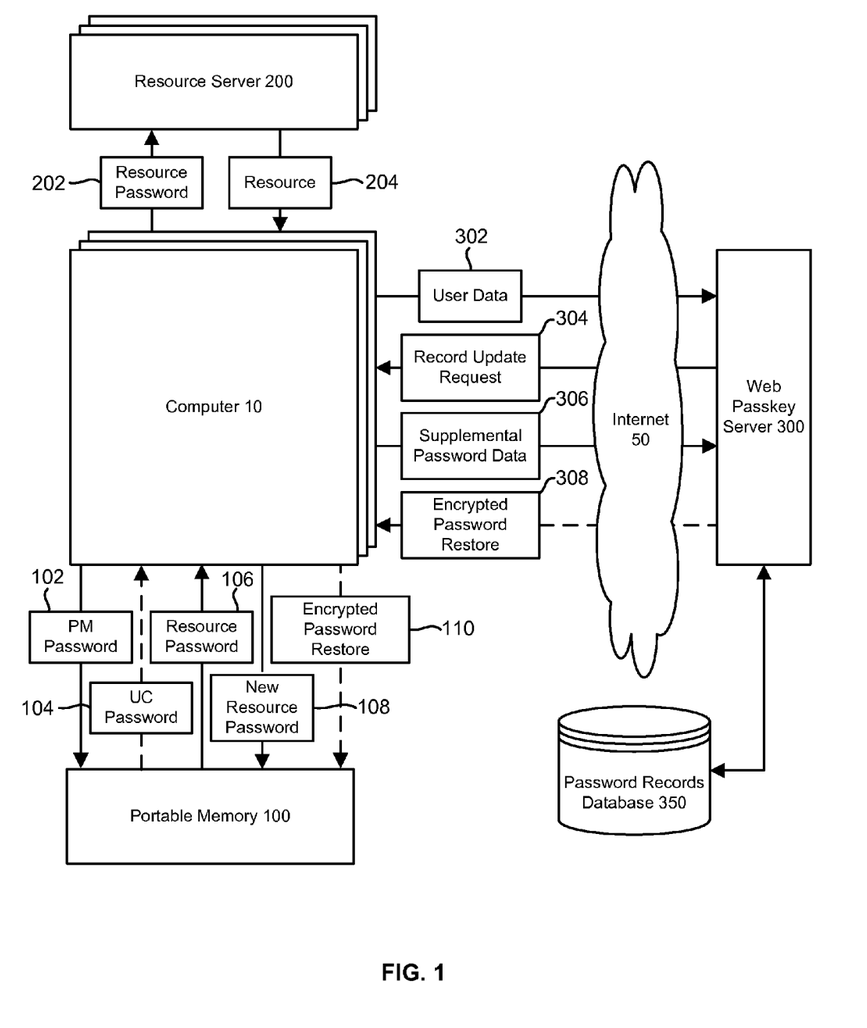
FIG. 1 is a schematic diagram of a system according to the present invention.

FIG. 1 shows an exemplary system for portable storage of information with Internet storage and restore according to the present invention. The system includes at least one user computer 10, such as a personal computer, and a web passkey server 300 in communication with the user computer 10 via the Internet 50. In some embodiments, the server 300 is a web server.

There is at least one database 350 in communication with the server 300, including password information pertaining to each of a plurality of users. The database 350 may further include other data pertaining to the users including, e.g., user and/or log-in names, bookmarks, cookies, web history, and web downloads. In some embodiments, the database 350 is dedicated for the storage of password information and other data and is encrypted. Each user's password information and data may also be separately encrypted in the database 350. Users can access the server via an Internet browser to register with the system and transfer passwords and other data from their user computer to the database 350, or manually enter such passwords and other data for storage in the database 350 (see, e.g., FIG. 5).

The system further includes one or more portable memory devices 100, such as flash drives. The portable memory device 100 is small in size, such thumb-sized or smaller, or any size which allows the device 100 to be sufficiently portable. The portable memory device 100 is readily attachable to computers (e.g., computer 10). For example, the portable memory device 100 may be connectable to the user computer 10 via a USB or Fire Wire connection, or a short length radio wave connection (e.g., Bluetooth).

As shown in FIG. 1, the portable memory device 100 includes password data, such as resource passwords 106/202 to allow the user to access any number of resource servers 200. For example, the portable memory device 100 may include passwords to access any number of resources including travel websites/servers, banking websites/servers, email websites/servers and any other website and/or server requiring a password or other log-in information. In some embodiments, the resource password 202 allows the user to receive a password protected resource 204 (e.g., data, information, booking or transaction confirmation, etc.) from the resource server 200. The portable memory device 100 may also include user computer passwords 104 for logging on to particular user computers 10 or terminal servers.

The portable memory device 100 may also include one or more software modules for accessing, retrieving and/or storing password information and other data as described herein. For example, in one embodiment, all of the software of the system is stored on the portable memory device 100 and/or the server and database 300/350 to allow use of the system without storing any software on the user computer 10.

The portable memory device 100 is preferably password protected and requires that the user provide a portable memory password 102 to access the password data stored therein. The password 102 may be entered via an interface of the system (e.g., generated by software on the portable memory device 100) that opens up upon connecting the portable memory device 100 to the computer 10, or, in some embodiments, via a drive access window or other system tool on the computer 10. Upon the portable memory password 102 being verified, the user can access all of the passwords and other data on the portable memory device 100 and, in some embodiments the system auto-fills resource passwords 202 from the portable memory device 100. Thus, by entering a single password, the user obtains access to all of his/her passwords and other data on the portable memory device 100. The user can then browse the Internet and access any number of resources and/or websites having his/her associated resource password 202 automatically entered.

The password data on the portable memory device 100 may also be encrypted. In some embodiments, upon entering the portable memory password 102, the passwords and other data on the memory device 100 is decrypted for access by the user.

New and changed resource passwords 108 are stored to the portable memory device 100. In some embodiments, the system includes software for identifying password information entered by the user on the user computer 10 and storing the identified password information in the portable memory device 100, and/or in the database 350. For example, password information may be automatically stored to the portable memory device 100 upon being entered via an Internet browser on the user computer 10.

The passwords and other data stored on the portable memory device 100 are also stored in the database 350 in communication with the server 300. Thus, users of the system can access their data without the portable memory device 100 and can easily replace the data on their portable memory device 100 in the event that it is lost. In some embodiments, the user can operate the system directly from the database 350, i.e., without using the portable memory device 100, to browse the Internet and access any number of resources and/or websites having his/her associated resource password 202 automatically entered.

In some embodiments, upon entering the portable memory password 102, the user is also able to access the user's information in the database 350. For example, the portable memory password 102 may be the same as a web passkey password to access and/or decrypt the user's data in the database 350. Entering the portable memory password 102 may both open the portable memory device 100 and an interface to the user's data in the database 350. This allows the user to access all of their passwords and other data, and also access resource servers and other password protected information via the Internet, while only having to remember a single password. In other embodiments, a different web passkey password is entered (e.g., via the interface) to access the database 350.

Figure 2:
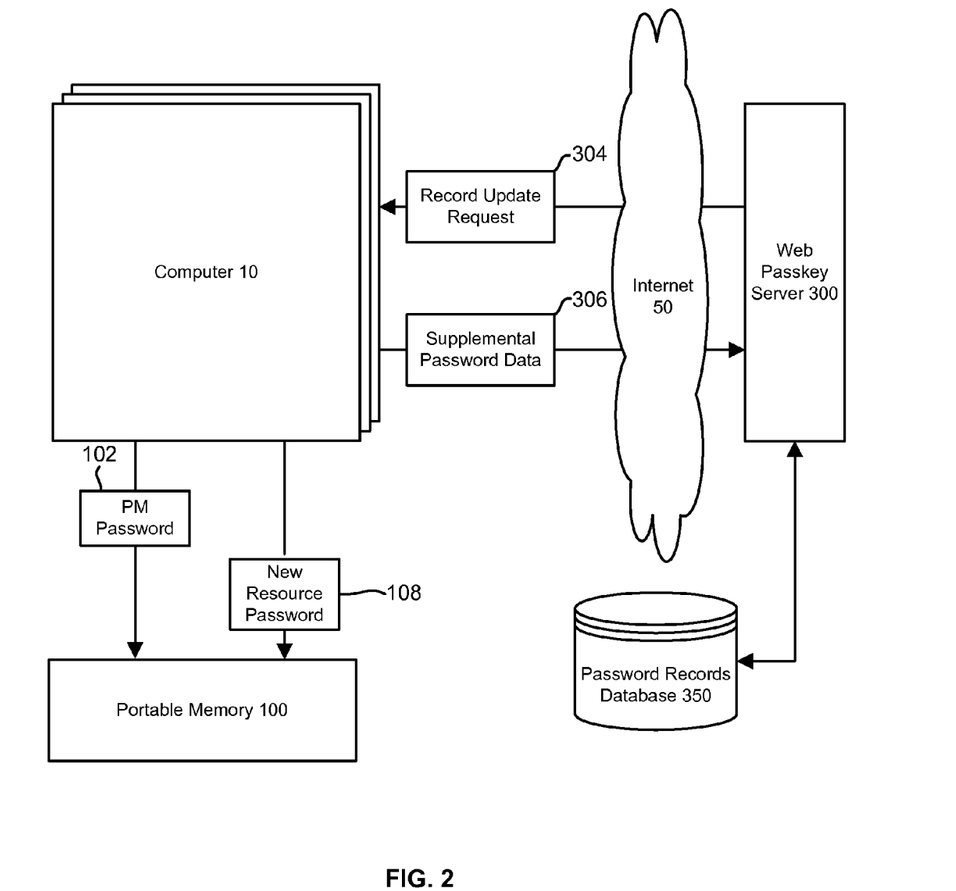
FIG. 2 is another schematic diagram of the system shown in FIG. 1.

The system may periodically retrieve passwords from the portable memory device 100 and send the passwords to the server 300, or may do so upon the user logging in to the server 300, or upon the user's command. For example, as shown in FIG. 2, the user may enter user-identifying information 302 (e.g., a web passkey username and/or password) to access the server 300 and receive a record update request 304 from the server 300. In response, the user may provide supplemental or updated password data 306. In some embodiments, the system includes software for scanning the portable memory device 100 and comparing the data to the user's data in the database 350 to determine whether an update is needed. The system may then prompt the user to update or automatically initiate an update procedure.

The system allows users to restore and/or update password data from the server 300 to the portable memory device 100. For example, if a user loses a device 100 and/or gets a new device 100, all of the user's passwords can be restored to the device 100. Thus, even if the user is away from his/her personal computer, he/she can easily repopulate all the data on a new replacement portable memory device 100 using any computer 10, such as a public computer.

Figure 3:
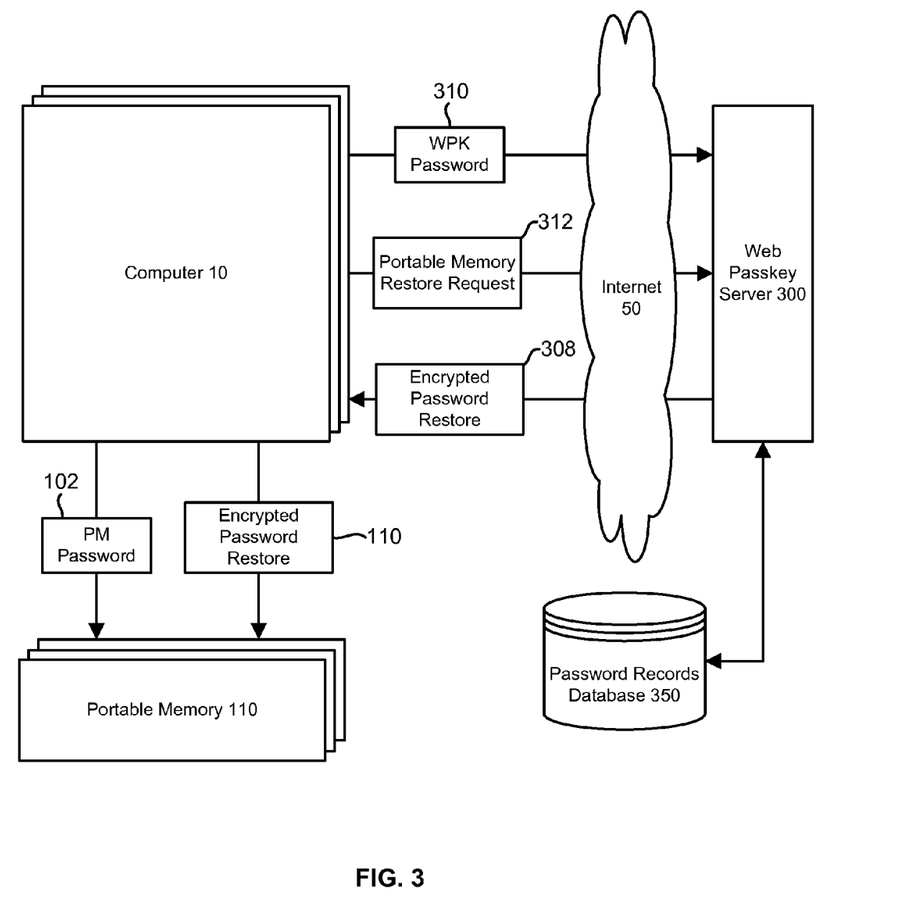
FIG. 3 is another schematic diagram of the system shown in FIG. 1.

Software executing on the server 300 retrieves encrypted password information associated with the particular user from the database 350, and software executing on the server 300 transfers a copy of the retrieved password information from the database 350 to the portable memory device 100 via the user computer 10. In one embodiment shown in FIG. 3, the user sends a portable memory restore request 312 to the server and a password restore 308/110 is received by the computer 10 and transferred to the portable memory device 100. The system may restore all the password information to a device 100 directly without having to download or store any of the information on the computer 10. In some embodiments, the system includes software to recognize whether the connected portable memory device 100 is a new or blank device and automatically initiates the restore procedure. For example, the software may scan the device 100 and recognize that data is lacking or does not include any of the user's same data as in the database 350.

Figure 4:
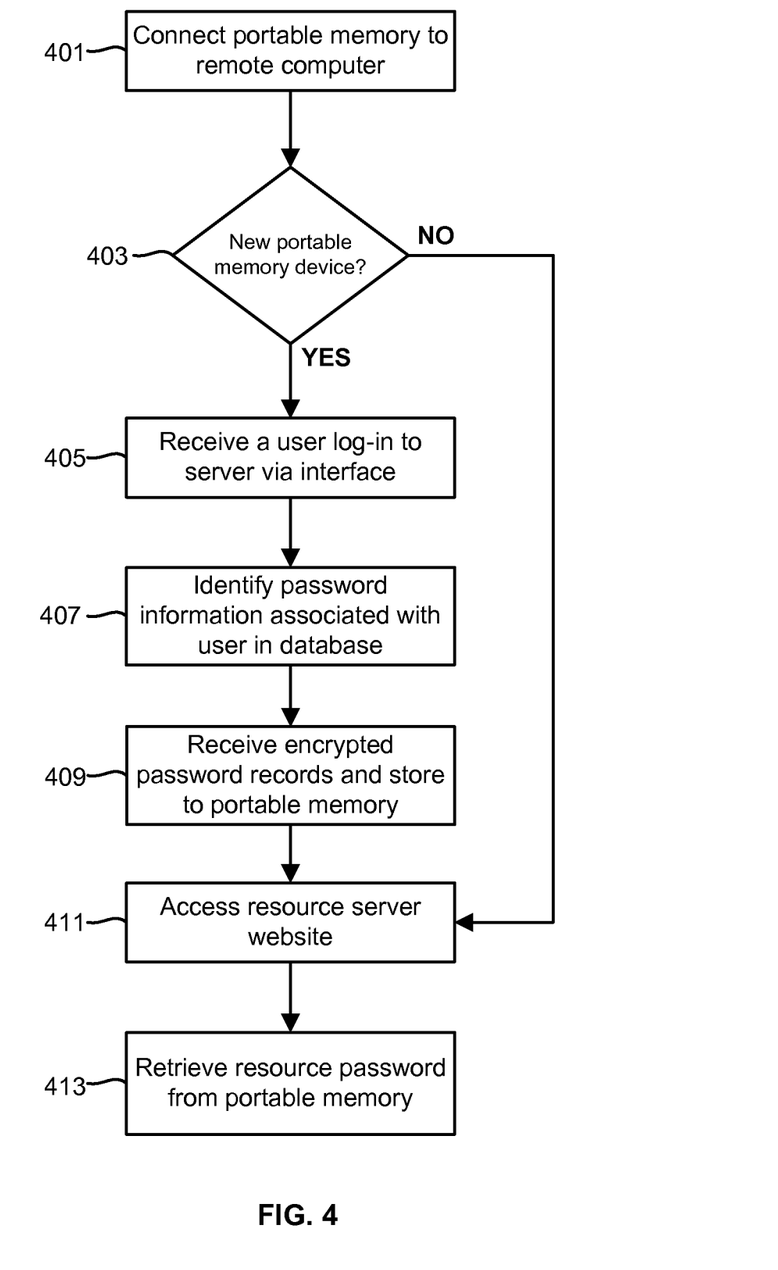
FIG. 4 illustrates a method employable by the system shown in FIG. 1.

FIG. 4 illustrates a method of storing, backing up, and restoring information on a portable memory device employable by the system shown in FIG. 1. The method includes the steps of connecting a portable memory device to a computer, the portable memory device being thumb-sized or smaller, and displaying an interface on the computer (step 401). If the portable memory device is not a new device (step 403), as recognized by the system or identified by the user, the method includes accessing one or more resource servers using password information stored on the portable memory device (steps 411-413). If the portable memory device is a new or blank device as recognized by the system or identified by the user, the method includes steps to restore password information from the server to the device. In particular, the method includes receiving a user log-in to a server via the interface, manipulating the user log-in to identify password information associated with a particular user in at least one database in communication with the server comprising password information pertaining to each of a plurality of users, and retrieving the identified password information associated with the user from the at least one database (step 405-407). The method also includes transferring a copy of the retrieved password information from the database to the portable memory device via the computer (step 407).

Figure 5:
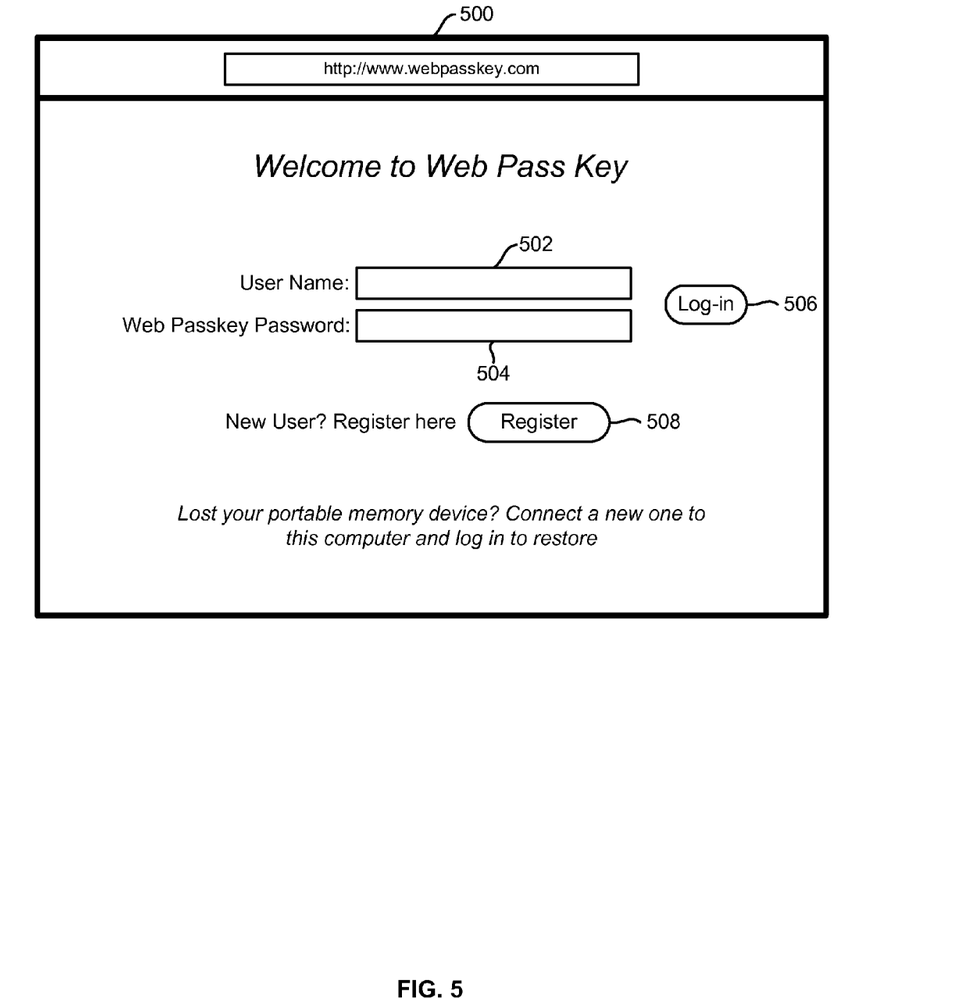
FIG. 5 is an interface of the system shown in FIG. 1.
Figure 6:
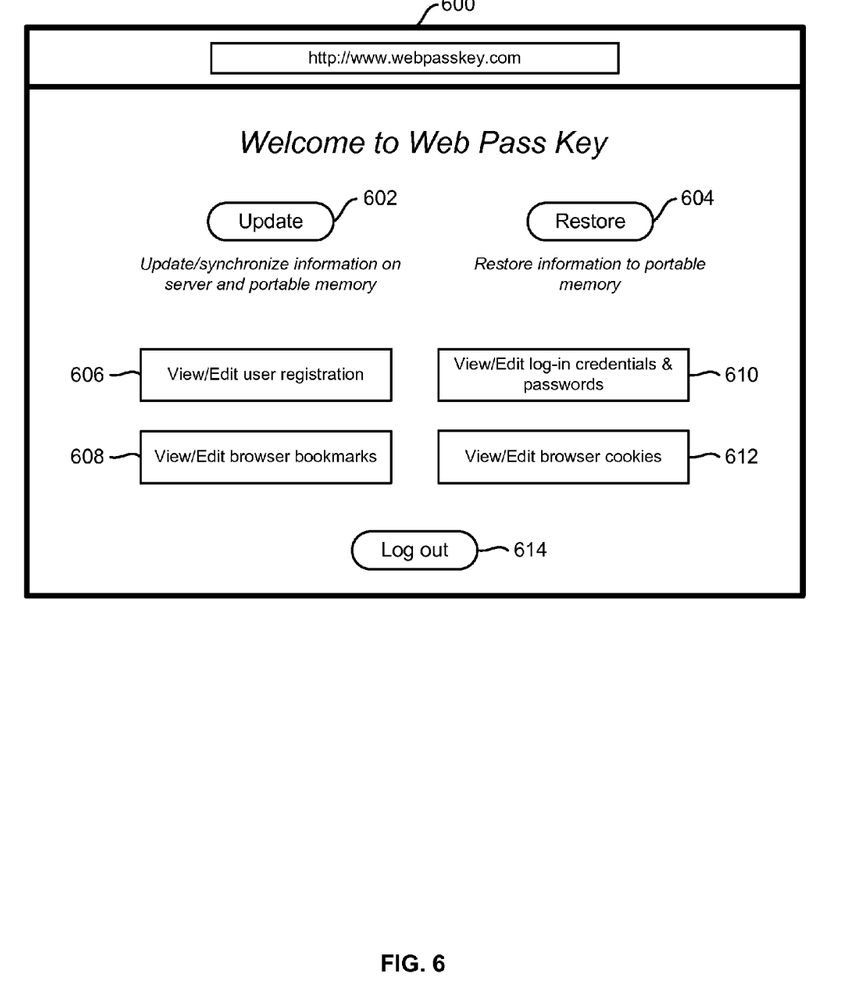
FIG. 6 is an interface of the system shown in FIG. 1.

The system includes interfaces 500/600, shown in FIGS. 5-6, for providing each of said plurality of users with access to the server 300 via the Internet 50. For example, the system may generate the interface 500/600 using software executing on the computer 10, the server 300, and/or the device 100 to receive and display data. As shown in FIG. 5, a user may access the interface 500 and register as a first time user (via a register button 508), or log in (via a log in button 506) using the user's existing user-identifying data, such as a web passkey username 502 and/or password 504. As shown in FIG. 6, the interface 600 includes buttons 602 and 604 to allow the user to update the data on their portable memory device 100 and restore data to a new or replacement portable memory device. The interface 600 may include additional buttons 606-612 to view and/or edit the user's registration information, view/edit bookmarks, view/edit log-in credentials and passwords, and view/edit browser cookies.

Although the invention has been described with reference to a particular arrangement of parts, features and the like, these are not intended to exhaust all possible arrangements or features, and indeed many modifications and variations will be ascertainable to those of skill in the art.

What is claimed is:

1. A system for portable storage of information with Internet storage and restore, comprising:
   a portable memory device;
   a server;
   at least one database in communication with said server comprising password information pertaining to each of a plurality of users;
   at least one user computer in communication with said server via the Internet;
   an interface providing each of said plurality of users with access to said server via the Internet;
   software executing on said server for receiving user-identifying data via said interface pertaining to a particular user;
   software executing on said server for retrieving password information associated with the particular user from said database;
   software executing on said server for transferring a copy of the retrieved password information from said database to said portable memory device while retaining a duplicate copy of the password information associated with the particular user in said database; and
   software executing on said server for comparing data on said portable memory device to the password information associated with the particular user from said database and updating the information associated with the particular user in the database if the data on the portable memory device does not substantially match the password information associated with the particular user in the database.

2. The system according to claim 1, further comprising:
   software executable on at least one of said user computer and said portable memory device for decrypting the portable memory device upon receiving and verifying a portable memory device password entered by the user.

3. The system according to claim 2, further comprising:
   software for displaying said interface via an Internet browser on the user computer, and providing access to the particular user's password information in the database upon verifying the portable memory password entered by the user.

4. The system according to claim 2, wherein the user-identifying data includes the portable memory password.

5. The system according to claim 1, further comprising:
   software executing on at least one of said server and said user computer for auto-filling password information stored on said portable memory device into an Internet browser displayed on said user computer.

6. The system according to claim 5, wherein said software for auto-filling password information is stored on said portable memory device.

7. The system according to claim 1, wherein said server is a web server.

8. The system according to claim 1, wherein the password information in said database is encrypted.

9. The system according to claim 1, wherein said software for transferring the copy of the retrieved password information to said portable memory device further encrypts the copy.

10. The system according to claim 1, further comprising:
    software executing on said server for receiving password information entered by the user via said interface and storing the entered password information in at least one of said database and said portable memory device.

11. The system according to claim 1, further comprising:
    software executing on said server for identifying password information entered on said user computer and storing the identified password information in at least one of said database and said portable memory device.

12. The system according to claim 11, wherein said identified password information is automatically stored to said portable memory device upon being entered via an Internet browser on said user computer.

13. The system according to claim 1, wherein said software for storing the retrieved password information stores such information upon receiving a restore request via said interface.

14. The system according to claim 1, wherein said portable memory device is a flash drive.

15. The system according to claim 1, wherein said portable memory device is a USB flash drive.

16. The system according to claim 1, wherein the password information includes at least one password for accessing a website and at least one password for accessing said user computer.

17. The system according to claim 1, wherein said portable memory device includes browser data, including at least one of bookmarks and cookies, pertaining to the particular user.

18. The system according to claim 1, wherein said database includes browser data, including at least one of bookmarks and cookies, pertaining to a plurality of users.

19. The system according to claim 1, further comprising: software executing on said server for retrieving information from said portable memory device and storing the information in said database.

20. The system according to claim 19, wherein said software for storing information from said portable memory device stores the information upon the user logging in via said interface.

21. The system according to claim 19, wherein said software for storing information from said portable memory device stores the information upon completion of a browser session.

22. A method of storing, backing up, and restoring information on a portable memory device, comprising the steps of:
displaying an interface on a computer;
receiving a user log-in to a server via the internet from the interface;
manipulating the user log-in to identify password information associated with a particular user in at least one database in communication with the server comprising password information pertaining to each of a plurality of users;
retrieving the identified password information associated with the user from the at least one database;
transferring a copy of the retrieved password information from the database to a portable memory device while retaining a duplicate copy of the password information associated with the user in the database;
comparing data on the portable memory device to the password information associated with the particular user in the database; and
updating the information associated with the particular user in the database if the data on the portable memory device does not substantially match the password information associated with the articular user in the database.

23. The method according to claim 22, wherein the step of transferring the copy of the retrieved password information from the database to the portable memory device includes comparing data on the portable memory device to the password information associated with the particular user in the database and transferring the copy only if the data on the portable memory device does not substantially match the password information associated with the particular user in the database.

24. The method according to claim 22, wherein the interface is generated via software stored on the memory device.

25. The method according to claim 22, further comprising the step of:
decrypting the copy of the retrieved password information.

26. The method according to claim 22, further comprising the steps of:
identifying password information entered via an Internet browser on the user computer; and
storing the password information in at least one of the database and the portable memory device.

27. The method according to claim 22, wherein the portable memory device is wirelessly connected to the computer.

* * * * *